United States Patent Office 3,119,868
Patented Jan. 28, 1964

3,119,868
PREPARATION OF TRIALKANESULFONYL-
AMINE-N-OXIDES
Charles M. Starks, Ponca City, Okla., assignor to Continental Oil Company, Ponca City, Okla., a corporation of Delaware
No Drawing. Filed Dec. 30, 1960, Ser. No. 79,912
6 Claims. (Cl. 260—556)

This invention relates to the preparation of oxidation derivatives of sulfinic acids and more particularly to the preparation of N-oxides of an alkanesulfonylamine. Still more specifically, the present invention concerns the preparation of a tri(alkanesulfonyl)amine-N-oxide by an improved process wherein an aluminum alkanesulfinate is reacted with either nitrous or nitric acid or alternatively a di(alkanesulfonyl)hydroxylamine is reacted with either of said acids.

The chemistry of the sulfino radical is at present rather unfamiliar considering the extent known about the chemical nature of most of the other functional groups encountered in the field of organic chemistry. This is probably due mainly to the comparatively unstable characteristics of sulfinic compounds and further to the difficulties experienced in the past in preparing these compounds. Consequently, most of the derivatives of the sulfinates, such as for instance the products obtained in the practice of this invention, are not too well known. In spite of this, however, the tri(alkanesulfonyl)amine-N-oxides have recognized usefulness as oxidizing agents generally and specifically in the latter role in the catalytic art, and as chemical intermediates. Undoubtedly, the fields of application of these substances will broaden as the substances themselves become more available.

Heretofore, it has been suggested that oxides of alkanesulfonyl amines can be prepared by reacting an alkali or alkaline earth metal salt of an alkanesulfinic acid with either nitric acid to obtain the oxide directly or by successively reacting any of said salts with a sufficient amount of nitrous acid whereby the di(alkanesulfonyl)hydroxylamine formed in the course of reaction is further oxidized to yield the desired product. The preparation procedure suggested by the prior art has not proven wholly sucessful, for in such practices the yield of final product is very low. Furthermore, in arriving upon the desired products via the nitrous acid oxidation procedure suggested, not only are low yields realized but the end reaction mixture is objectionally contaminated with by-products thereby rendering the separation of the desired amine oxides a difficult task.

According to this invention, it has been found, unexpectedly, that the shortcomings of the prior practice can be overcome by the simple expedient of employing an aluminum salt of the alkanesulfinic acid rather than using the particular metallic salts shown in the prior art attempts. According to the present invention, the aluminum alkanesulfinates are caused to react smoothly under very moderate conditions to provide high yields of the desired oxidation products relatively free of by-product contaminants.

My discovery of the unique applicability of these aluminum salts for preparing the N-oxides of an alkanesulfonyl amine is fortuitously adapted to take advantage of the important developments that have occurred rather recently in the field of organo-metallic chemistry. Thus at present, a broad spectrum of alkyl aluminum compounds are readily obtainable which compounds, as will be seen herein, can be conveniently converted to the aluminum sulfinates serving as the precursors of products secured in the practice of this invention.

The aluminum sulfinates contemplated as the starting materials in the reactions of this invention can be readily obtained by reacting a trialkyl aluminum compound with sulfur dioxide. In turn, the trialkyl aluminum compounds useful in preparing the corresponding sulfinate derivatives can be secured by the synthesis mode alluded to above involving the reaction of lower aluminumalkyls, as for example, triethyl aluminum and tripropyl aluminum with a low molecular weight olefin such as ethylene or propylene, and more preferably the former, via a growth process whereby the olefinic monomer progressively adds to the alkyl substituents of the aluminum molecule. This method generally results in a mixture of aluminumalkyl compounds, usually termed a smear, wherein the alkyl groups are essentially linear in nature and range in carbon chain lengths from about 4 to 20 and even higher. Further details regarding the preparation of these growth products as well as details concerning selective segregation of the various components thereof can be found in U.S. Patent 2,863,896 among others.

As mentioned, the sulfinates useful in the practice of this invention can be obtained by reacting a trialkyl aluminum compound of the class described directly hereinabove with sulfur dioxide. This reaction is advantageously carried out in the presence of a solvent for the sulfur dioxide. Applicable reaction temperatures vary between about 0° and 50° C. although somewhat higher temperatures can be utilized under certain conditions. Because of the tendency of many of the sulfinates herein concerned to form a gel in the presence of certain solvents, especially when operating at the higher reaction temperatures indicated, it is particularly desirable to select a solvent component which obviates or minimizes this tendency. Suitable among such solvents are ethers, especially the higher boiling ethers, nitrogenous substances not possessing a nitrogen-to-hydrogen bond such as heterocyclic nitrogen bases, disubstituted amides and tertiary amines. Among specific suitable solvents there are: pyridine, triethyl amine, dimethyl formamide, diphenyl ether, dimethyl aniline and the like. Further details pertaining to the above procedure for preparing the sulfinates can be found in British Patent No. 819,181.

The reaction of the present invention utilizes alternatively either nitric acid or nitrous acid as oxidizing agents. Additionally, nitrous acid can be used initially to form the intermediate oxidation product di(alkanesulfonyl)hydroxylamine and this intermediate can then be oxidized to the ultimate product employing either nitric acid or nitrous acid.

As indicated previously, suitable sulfinates for use in accordance with this invention include all the aluminum sulfinates wherein the alkyl substituent has from 2 to about 50 carbon atoms. The preferred sulfinates, however, are those having alkyl substituents ranging from about 2 to 30 carbon atoms. Examples of alkyl groups that can be present are ethyl, propyl, butyl, isobutyl, amyl, hexyl, heptyl, octyl, nonyl, decyl, dodecyl, tridecyl, tetradecyl, hexadecyl, octadecyl and the like.

The reactions underlying the instant processes can be represented schematically as follows:

(I) $(RSO_2)_3Al + 4HNO_3$
$\rightarrow (RSO_2)_3NO + Al(NO_3)_3 + 2H_2O$ (II) $2(RSO_2)_3Al + 6HNO_2 + 6HCl$
$\rightarrow 2(RSO_2)_3NO + 4NO + AlCl_3 + 6H_2O$ (III)
(a) $2(RSO_2)_3Al + 3HNO_2 + 6HCl$
$\rightarrow 3(RSO_2)_2NOH + AlCl_3 + 3H_2O$ (b) $3(RSO_2)_2NOH + 3HNO_3$
$\rightarrow 2(RSO_2)_3NO + 3H_2O + NO + 3NO_2$ (c) $3(RSO_2)_2NOH + 3HNO_2$
$\rightarrow 2(RSO_2)_3NO + 3H_2O + 4NO$ where R represents an alkyl radical of the type described directly hereinabove.

In general, the oxidation reactions of this invention can be conducted at a temperature ranging from about −20° C. to 100° C. and more preferably from about 20° C. to about 30° C. Atmospheric pressure is usually employed but superatmospheric pressures can be used.

All the reactants can be charged to a reactor simultaneously and this represents the preferred procedure. It is advantageous, however, to provide an inert reaction medium. Suitable among such media are: water, acetic acid solution, or a two-phase reaction medium such as water-ether, water-liquid hydrocarbon, etc. Operation within an aqueous medium is the preferred mode of carrying out the reactions of this invention.

Either nitric acid or nitrous acid can be satisfactorily used to prepare the N-amine oxide derivatives of the aluminum sulfinates. It is preferred, however, to employ nitric acid in this manner. The amount of nitric acid required is at least stoichiometric in accordance with the reaction scheme set forth hereinabove. Generally, it is desirable to use from about 3 to 30% excess of nitric acid over the stoichiometrical requirement and more preferably between about 3% and 10% in excess thereof.

When employing nitrous acid, the sulfinate is first converted into a di(alkanesulfonyl)hydroxylamine and then this intermediate can be further oxidized to the desired product by using additional quantities of nitrous acid or, as indicated above, the hydroxylamine can be further oxidized through the use of nitric acid. When employing nitrous acid solely to achieve the desired product, the requisite quantity of acid needed to obtain the N-oxide can be added to the reaction sphere initially. A convenient way of oxidizing the sulfinate through the use of nitrous acid is to incorporate the necessary quantities of a soluble nitrite within an aqueous reaction mixture and then add a mineral acid thereto in order to liberate the nitrous acid. Employing this procedure one can also use additional quantities of mineral acid to effect reaction modes in accordance with Equations II and III(a) hereinabove. Generally it is desirable to add the displacement acid continuously to the reaction medium and thus generate the nitrous acid in a continuous manner during the course of the reaction.

After the desired reaction has been effected, the N-amine oxide products derived therein can be readily recovered by various conventional means. One such suitable way consists of extracting the reaction mixture with ether and thereupon recovering the product from the ethereal extract after subjecting same to the usual purification procedures.

The invention will be further illustrated in conjunction with the following examples which are to be taken as illustrative only and not by way of limitation.

*Example I*

Into a siutable reaction vessel equipped with a thermometer and stirrer were charged 5 parts of aluminum 1-octane sulfinate, 50 parts of water and 15 parts of sodium nitrite. Solution of the charged components was effected by stirring and thereafter 25 parts of hydrochloric acid were continuously added to the reactor over a period of 30 minutes. The reaction temperature was maintained at room temperature throughout the addition of the hydrochloric acid and subsequent thereto for a holding period of 60 minutes. The resultant reaction mixture was thereupon extracted with ether. The ethereal solution was washed with water, dilute sodium bisulfite and 10% sodium carbonate in that order and dried over magnesium sulfate. Evaporation of the ether under reduced pressure gave 3.1 parts (62% yield) of tri(1-octanesulfonyl)-amine-N-oxide, $n_D^{25}$ 1.4480.

*Example II*

Into a reaction vessel equipped as in Example I were charged 5 parts of aluminum 1-octanesulfinate, 100 parts of water and 6 parts of nitric acid. The reaction mixture was stirred at room temperature for 16 hours. The resultant organic phase was extracted into ether and worked up as in the preceeding example to give 3.8 parts (76% yield) of tri(1-octanesulfonyl)amine-N-oxide, $n_D^{25}$ 1.4405.

The infrared spectrum of the reaction product of this example indicated that it was contaminated with a minute quantity of a carboxylic acid and possibly octanethiosulfinate for otherwise the analysis curve corresponded substantially identically with the data observed for a pure sample of the oxide and that of product obtained in Example I.

What is claimed is:

1. A process for the preparation of a tri(alkanesulfonyl)amine-N-oxide which comprises reacting at a temperature between about −20° and 100° C. an aluminum alkanesulfinate having alkyl groups of from 2–50 carbon atoms with a member selected from the group consisting of nitrous acid and nitric acid.

2. A process for the preparation of a tri(alkanesulfonyl)amine-N-oxide which comprises reacting at a temperature between about −20° and 100° C. an aluminum alkanesulfinate having alkyl groups of from 2–50 carbon atoms with nitric acid.

3. A process for the preparation of tri(alkanesulfonyl)-amine-N-oxide which comprises reacting at a temperature between about −20° and 100° C. an aluminum alkanesulfinate having alkyl groups of from 2–50 carbon atoms with 3 moles of nitrous acid.

4. A process for the preparation of a sulfonylamine-N-oxide having the formula $(RSO_2)_3NO$, wherein R is an alkyl group of from 2 to 30 carbon atoms which comprises reacting in an aqueous medium at a temperature between about 20° and 30° C. an aluminum alkanesulfinate having an alkyl group of from 2 to 30 carbon atoms with nitric acid.

5. A process for the preparation of tri(1-octanesulfonyl)amine-N-oxide which comprises reacting aluminum 1-octanesulfinate with nitric acid in an aqueous medium at a temperature between about 20° and 30° C.

6. A process for the preparation of tri(1-octanesulfonyl)amine-N-oxide which comprises reacting aluminum 1-octanesulfinate with nitrous acid in an aqueous medium at a temperature between about 20° and 30° C.

References Cited in the file of this patent

Smith et al.: General Chemistry, pp. 584–596 (1936).
Marvel et al.; J. Org. Chem., vol. 13, pp. 822–829 (1948).
Marvel et al.: J. Am. Chem. Soc., vol. 73, pp. 859 (1951).